United States Patent [19]
Fukuoka et al.

[11] 4,164,762
[45] Aug. 14, 1979

[54] FACSIMILE CONTROL APPARATUS

[75] Inventors: Kenji Fukuoka, Fussa; Takayuki Anami, Hachioji, both of Japan

[73] Assignee: Olympus Optical Co., Ltd., Tokyo, Japan

[21] Appl. No.: 849,115

[22] Filed: Nov. 4, 1977

[30] Foreign Application Priority Data

Nov. 12, 1976 [JP] Japan .................. 51-135265

[51] Int. Cl.$^2$ ...................... H04L 13/04; H04L 13/08
[52] U.S. Cl. ........................................ 358/304; 346/24
[58] Field of Search ................... 358/304; 346/24; 355/29, 13

[56] References Cited
U.S. PATENT DOCUMENTS

| | | | |
|---|---|---|---|
| 3,184,540 | 5/1965 | Murphy | 358/304 X |
| 3,424,911 | 1/1969 | Cockrell | 358/304 X |
| 3,965,292 | 6/1976 | Costello et al. | 346/24 X |
| 4,005,257 | 1/1977 | Krallinger et al. | 358/304 X |

Primary Examiner—Alfred H. Eddleman
Assistant Examiner—Donald McElheny, Jr.
Attorney, Agent, or Firm—Haseltine, Lake & Waters

[57] ABSTRACT

A control apparatus for use in a frequency band compression facsimile receiver comprising means for generating a halt signal for a given duration at the time of engagement and/or disengagement of a sheet feed clutch and at the time of operation of a roll sheet cutter and means for interrupting reception of a record signal and reception of a request for transporting a record sheet in response to said halt signal. According to this invention, the timings of recording an image on a record sheet, transportation of the record sheet, feeding of a roll sheet and cutting of the roll sheet can be controlled at the time of engagement and/or disengagement of the sheet feed clutch or at the time of the cutter and such controls can be easily adjusted. As a result, an improved recorded image is obtained and the length of a sheet to be cut from a roll sheet is stabilized, without causing the jamming of record sheets.

3 Claims, 5 Drawing Figures

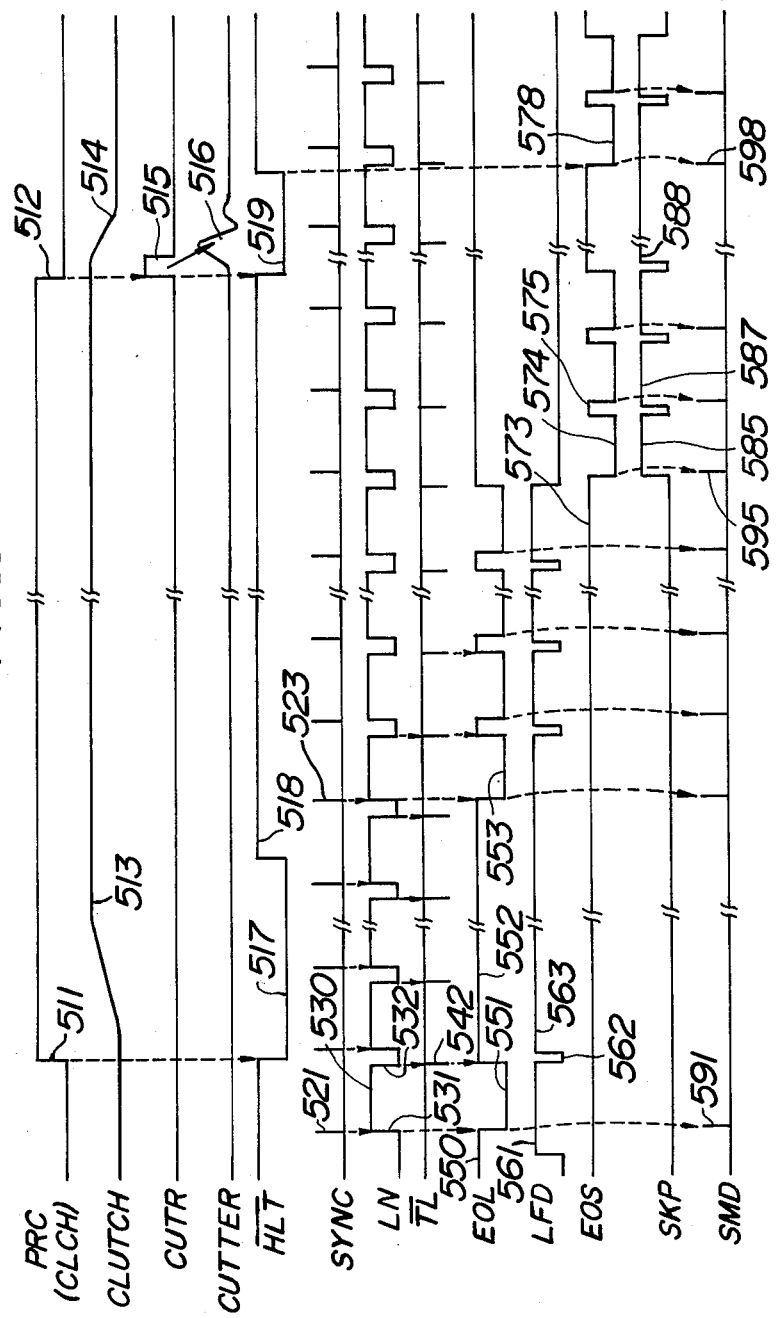

FACSIMILE CONTROL APPARATUS

BACKGROUND OF THE INVENTION

This invention relates to a facsimile control apparatus for use in a frequency band compression facsimile receiver, and more particularly to a facsimile control apparatus for controlling the cutting of a roll of record sheet to a given length and the transportation of a record sheet thus cut.

A prior art frequency band compression facsimile apparatus, as shown by way of example in FIG. 1, is comprised of a transmitting mechanism section, and a receiving and recording mechanism section. Referring to FIG. 1, a plurality of originals 1 to be transmitted are stacked in a superposed manner in the transmitting mechanism section located below a one-dotted line as viewed in the drawing. The plurality of originals 1 are set with their information surfaces directed downwards, so that these originals will be separated one by one sequentially from the lowermost original by means of a separating roller 2 and transported in the direction of arrow by means of a transporting belt (not shown). A set of an original detecting light source 3 and a detector 4 is disposed in opposing relation to each other in an original transporting passage, so as to detect the presence or absence of an original at an original detecting position 5, thereby producing a sheet control signal as shown at A in FIG. 2. A level $a_I$ of sheet control signal A represents the absence of an original being detected in the passage (or an interval between a preceding original and a succeeding original), and a level $a_{II}$ is indicative of the condition of an original being detected.

Turning back to FIG. 1, original 1 past original detecting position 5 is subjected to irradiation of light from an illumination light source 6 and linearly scanned at a right angle with respect to the direction of shift of the original, so that an image of original 1 is converted to an image signal. Conversion of an original image to an image signal is achieved by means of a bundle of optical fibers 7 having a linear end and a circular end. The bundle of optical fibers 7 is disposed in the vicinity of illumination light source 6, with its linear end opposing the original surface at a right angle with respect to the direction of shift of the original, and with its circular end opposing a rotary scanning optical system 8, in a manner that the circular end may be scanned by rotary scanning optical system 8. As a result, the resultant photo-signal is converted to an electrical signal representing an image signal by a photoelectrically converting element 9. The image signal is schematically shown at B in FIG. 2. A level $b_I$ of image signal B is indicative of a signal containing no effective image signal, namely, a scanning signal scanning an area other than the original surface, and a level $b_{II}$ having a hatched duration represents an original surface scanning signal which contains therein an effective image signal. A signal for virtually discriminating level $b_I$ from level $b_{II}$ is an original signal shown at C in FIG. 2, which signal is prepared from sheet control signal A in the following manner.

In FIG. 1, a length l of transportation of original 1 from original detecting position 5 to a position, at which the original is linearly scanned by the bundle of optical fibers 7, is constant. Since the original transporting belt (not shown), in general, is driven by a pulse motor, an instant $c_I$ at which the scanning starts and an instant $c_{II}$ at which the scanning terminates, respectively shown at C in FIG. 2, are determined respectively by counting the number of pulses for running the pulse motor, respectively from the leading edge $a_{III}$ of sheet control signal A in FIG. 2 and from the trailing edge $a_{IV}$ of signal A. In other words, the length of delay time $l_C$ is determined by a given number of pulses corresponding to the distance l (the length of transportation of an original) shown in FIG. 1.

Among the signals shown in FIG. 2, sheet control signal A and image signal B are to be transmitted to the receiving side. Original signal C is not necessarily transmitted to the receiving side, because the original signal can be easily reproduced from the sheet control signal, as described in the above.

In a band compression facsimile of this type, a scanning line density signal d is also transmitted to the receiving side at every time of initiation of the scanning for each original, as shown at D in FIG. 2. These signals to be transmitted are encoded in the manner schematically shown at E in FIG. 2, and then transmitted to the receiving side. The way of encoding these signals is not a subject matter of the present invention, and hence no description is given further.

Turning back to FIG. 1, the receiving and recording mechanism section located above the one-dotted line will be explained. When transmission codes such as shown at E in FIG. 2 are received, there are obtained decoded signals F, G and H in FIG. 2 corresponding to signals A, B and D, respectively, by means of a decoder unit (not shown).

Reference alphabet F illustrates a sheet control signal, by which a record sheet feeding signal and a cutting signal are formed. The arrangement shown in FIG. 1 is in the case of an electrophotographic recording. In this embodiment, an electrophotographic record sheet is fed by a roll sheet 10, and the leading end thereof normally stands by at a cutting position 12 in a cutter 11. Insomuch as sheet control signal F (in FIG. 2) is at a level $f_I$, roll sheet 10 remains stationary. When signal F is raised to a level $f_{II}$, the roll sheet is rotated in the direction of arrow, so that the roll sheet is paid out by a given length through roll sheet feed roller 20. Simultaneously therewith, a record sheet 10' which has already been cut by a given length and transported to some extent in the preceding cycle is also shifted. In general, roll sheet 10, in some cases, is required to be stopped at a standing-by position even for a duration that record sheet 10' is being transported for recording. In view of this, it is necessary that pulse motors as driving power sources be separately provided. Alternatively, only a single power source may be used, while the drive of the roll sheet is controlled by means of a clutch 21. This apparatus is assumed of taking the latter means. In such a case, engagement and disengagement of a clutch can be accomplished by sheet control signal F in FIG. 2. More specifically, the clutch disengages at level $f_I$, and the clutch engages at level $f_{II}$. Level $f_{II}$ corresponds to level $a_{II}$ of sheet control signal A in the transmitting side. Thus, in response to the transportation of original 1 to be transmitted through original detecting systems 3 and 4, in the transmitting side, a record sheet is fed from roll sheet 10 via cutter 11 in the receiving side.

Let us now assume that the receiving side starts receiving an effective image signal of image signal G which is contained in a hatched area and represented by a level $g_{II}$ with a delay time $l_G$ after the leading edge $f_{III}$ of sheet control signal F. A level $g_I$ of signal G and said hatched area (duration) $g_{II}$ of signal G correspond to levels $b_I$ and $b_{II}$ of image signal to be transmitted as shown at B in FIG. 2. At this instant, record sheet 10′ is already charged uniformly through a charger 13, and the leading end of record sheet 10′ has reached a recording position 14 at which the scanning for record is to be effected. The distance from cutting position 12 to recording position 14 is equal to the distance l from original detecting position 5 to the scanning position in the transmitting mechanism section.

The image signal G (hatched portion) thus decoded is converted to modulated light 16 by means of a light-modulator 15, such as a modulation laser, a glow tube, or a modulator of an external modulation type using such as a crystal. The modulated light 16 enters a rotary scanning optical system 17. A bundle of optical fibers 18 is linear at one end and circular at the other end, likewise the bundle of optical fibers 7 shown in the transmitting mechanism section. This circular end of optical fibers 18 is scanned by rotary scanning optical system 17. Accordingly, at the linear end of optical fibers 18 a scanning light which is subject to intensity modulation in response to the image signal contained in the level $g_{II}$ of image signal G in FIG. 2. The scanning light thus obtained scans the surface of record sheet 10′ which is transported opposite to the linear end of optical fibers 17 and in the direction perpendicular to the linear end. Consequently, an electrical resistance is lowered in the portion exposed to light on the record sheet surface 10′ to cause discharge of electric charge charged beforehand, whereby a latent image inverted due to electrostatic charge is formed on the record sheet surface. Image signal G in FIG. 2 contains a synchronizing signal representing the end of a scanning line, which is to be described later, and generates a record sheet transporting signal in synchronism therewith. The record sheet transporting signal is applied to a drive system using a pulse motor so as to transport intermittently record sheet 10′ which is already cut in accordance with the aforesaid synchronizing signal. Record sheet 10′ having thereon a latent image passes through a developing unit 19 containing therein toner, whereby the latent image on the record sheet is developed into a permanent visible image.

The trailing edge $f_{IV}$ of sheet control signal F generally occurs within the hatched duration of image signal G, namely in the midway of the effective image signal represented by level $g_{II}$. The trailing edge $f_{IV}$ of this signal corresponds to the trailing edge $a_{IV}$ of sheet control signal A in the transmitting side, and the record sheet cutting position 12 in the receiving side corresponds to the trailing end of the transmitted original. Thus, a cutting signal is generated in response to the trailing edge $f_{IV}$ of sheet control signal F, thereby allowing the cutting of the roll sheet. A latent image is produced on cut record sheet 10′ corresponding to a transmitted original image in the manner described above and then the cut record sheet 10′ having the latent image is delivered via developing unit 19, a pair of squeeze rollers 20 and a drier (not shown) to the outside of the apparatus.

An image signal I in FIG. 2 representing an effective portion of image signal G is not always necessary for achieving the record of an image, but it is easy to reproduce image signal I from sheet control signal F in FIG. 2. The way of reproducing such a signal is quite the same as that for preparing signal C from sheet control signal A, and hence no description is given.

Regarding a line density, a line density signal h appears at every initial stage in each effective portion (hatched duration) of image signal G as shown at H in FIG. 2. Line density signal h is stored for the purposes of recording an image as well as determining a length of transportation of a record sheet. It is clear from the above that, in the receiving side, the image recording position 14, namely the position at which a length of transportation of record sheet 10′ due to an intermittent sub-scanning is determined is spaced apart by a certain distance from the position 12 at which roll sheet cutter 11 is disposed. This results in the difficulty of controlling transportation and cutting of a record sheet. Even at the time of engagement and/or disengagement of a sheet feed clutch, or even at the time of operation of cutter 11, the recording of the image signal is continued, and a timing of transporting a record sheet as well as cutting the roll sheet to a given length give a delicate influence on a recorded image, with a likelihood of causing a variation in length of sheet cut or the jamming of record sheet in the peripheral portion.

For example, a delay in transmission of a sheet feed torque at the time of engagement of a sheet feed clutch causes a variation in an amount of a record sheet to be paid out, coupled with the intermittent scanning, thus resulting in an increased or decreased record in the leading end portion of the record sheet, or resulting in an error in a cutting length of record sheet. Although, at the time of cutting the roll sheet, a sheet feed clutch becomes disengaged, and a sheet feed torque for roll sheet 10 terminates, the cutting of the roll sheet is not surely completed at a high speed, thus exerting an unwanted load on the record sheet transportation, leading to a variation in scanning for record. A further difficulty has been experienced with the case where the originals are scanned with little or no interruption in the transmitting side, and image signals are transmitted successively to the receiving side. Fundamentally, the sheet feeding operation in the side of roll sheet 10, immediately after the termination of the cutting of the roll sheet, must be interrupted for a duration commensurate to a time gap between a previously transmitted original and a succeeding original to be transmitted in a subsequent cycle. Should the aforesaid duration be too short to disengage the clutch, or disengagement of the clutch be delayed, then the roll sheet would be unwantedly fed, despite of the closure of cutter blades 11. This causes an undesirable curl at the leading end of the roll sheet, and the curled leading end of the roll sheet would fail to pass through the pair of cutter blades, leading to the jamming in the peripheral portion. If a space between the pair of cutter blades 11 is increased in order to avoid the above problem, this increase would result in delaying the cutting operation. It follows that the aforedescribed problems occur.

SUMMARY OF THE INVENTION

It is accordingly an object of the present invention to provide a facsimile control apparatus for use in a frequency band compression facsimile receiver, which is capable of properly controlling the transportation of a record sheet as well as the cutting of a roll sheet.

To attain the object described, there is provided according to the present invention a facsimile control apparatus for use in a frequency band compression facsimile receiver, which comprises means for generating a halt signal for a given period of time at the time of engagement and/or disengagement of a sheet feed clutch as well as at the time of operation of a roll sheet cutter; and means for interrupting reception of a record signal and reception of a request for transportation of a record sheet, in response to said halt signal.

Other objects and features of the present invention will be apparent from the ensuing part of the specification in conjunction with drawings which indicate a preferred embodiment of the present invention.

BRIEF DESCRIPTION OF THE DRAWINGS

FIG. 5 is a timing chart of electric signals for illustration of the operation of FIG. 4.

DESCRIPTION OF THE PREFERRED EMBODIMENTS

Figure 3:
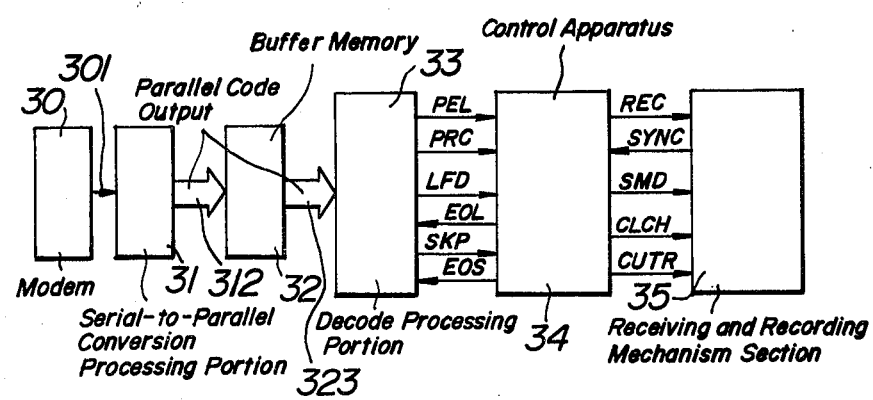
FIG. 3 is a block diagram of one embodiment of a frequency band compression facsimile receiver in which a facsimile control apparatus according to the present invention.

FIG. 3 shows a block diagram of a band compression facsimile receiver to which a facsimile control device of the present invention is applied. A signal fed through transmission line is demodulated by a modem 30 and converted to serial digital codes. A serial code output 301 from modem 30 is decoded and converted to parallel codes by a serial-to-parallel conversion processing portion 31 and a parallel code output 312 is written in an FIFO type writing and reading-out buffer memory 32. A parallel code output 323 read from buffer memory 32 is decoded in a decode processing portion 33 into a plurality of signals. The purality of signals thus decoded are transmitted through a control apparatus 34 of the present invention to a receiving and recording mechanism section 35 similar in construction to that of the apparatus shown in FIG. 1.

Figure 1:
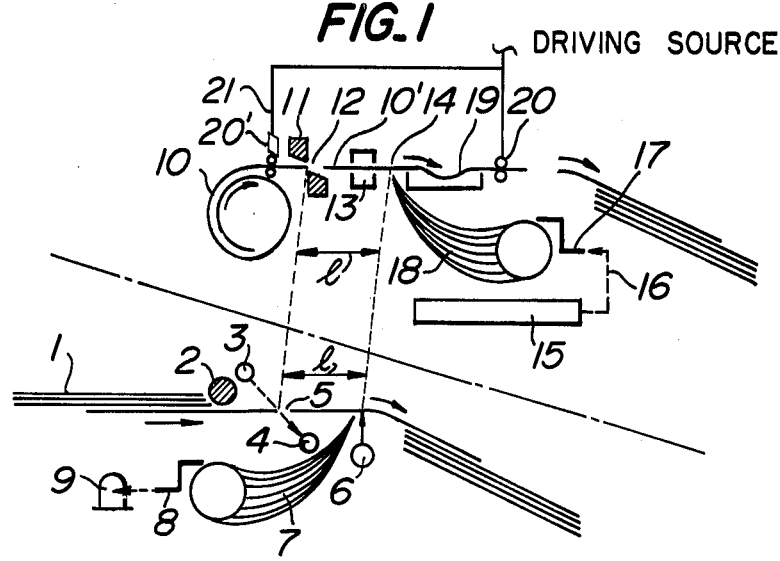
FIG. 1 schematically shows the arrangements of a frequency band compression facsimile apparatus prevailingly used.

The input and output signals of control apparatus 34 will be briefed. PEL represents a decoded image signal input, and REC an image signal output having a level converted properly for recording purpose. PRC is indicative of a sheet control signal for controlling the operations of a sheet feed clutch and a roll sheet cutter. LFD represents a transportation request signal for requesting transportation of a record sheet corresponding to one scanning line as well as requesting the recording of image signal input PEL. EOL represents a response signal which senses transportation request signal LFD and is indicative of the reception of transportation request, the transportation of the sheet corresponding to one scanning line and the termination of recording of the record sheet. SKP represents a skip requesting signal for requesting only the transportation of a record sheet, without recording, when one scanning line is fully blank, stated otherwise, a signal for requesting a skip for one scanning line. EOS is representative of a response signal which generates in response to skip requesting signal SKP and is indicative of reception of skip request and termination of transportation of a record sheet for one scanning line. Response signal EOL is responsive to transportation requesting signal LFD in synchronism with the aforesaid rotary scanning as a result of which image signal REC is recorded on the other hand, response signal EOS may be responsive to skip requesting signal SKP asynchronously with the rotary scanning. This point will be described in more detail in conjunction with a timing chart (FIG. 5) later. SYNC is representative of a synchronizing pulse signal which is generated in the initial stage of a scanning line in synchronism with the rotary scanning. SMD is a pulse signal for transporting a record sheet, namely for running a sub-scanning motor (as a sub-scanning motor, it is customary to use a pulse motor). CLCH represents a sheet feed signal for energizing a sheet feed clutch in order to pay out roll sheet 10 shown in FIG. 1. CUTR is indicative of a cutter signal for energizing cutter 11 as shown in FIG. 1.

Figure 4:
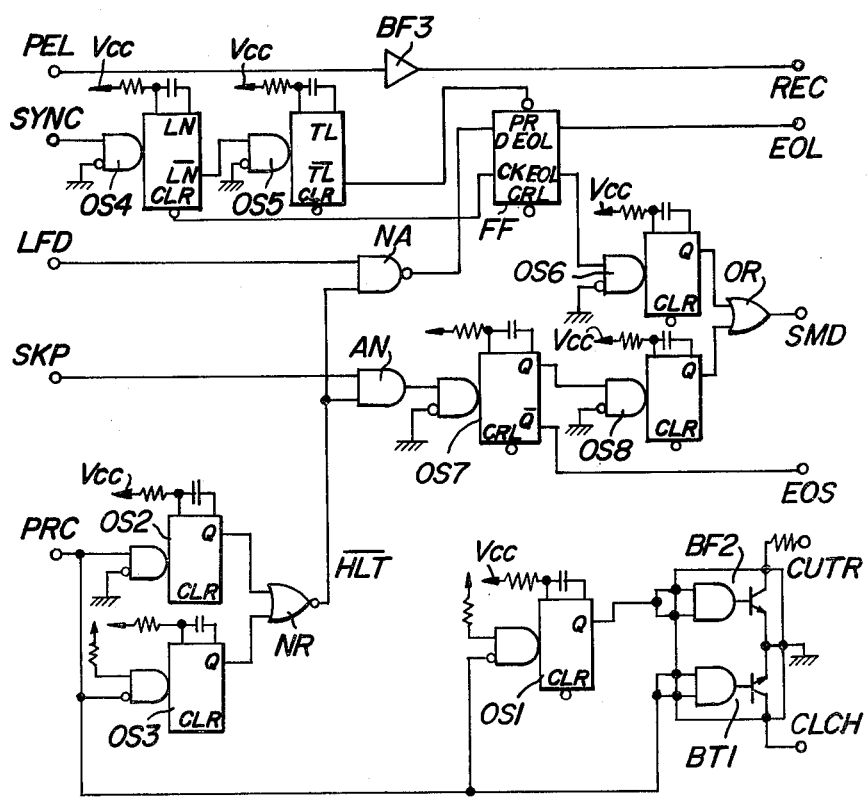
FIG. 4 is a circuit diagram of one embodiment of a circuit arrangement of a facsimile control apparatus according to the present invention.

FIG. 4 is a diagram of an electric circuit of the control apparatus according to the present invention shown in FIG. 3, and FIG. 5 is a timing chart of electric signals for illustration of operation of the circuit of FIG. 4.

Figure 2:
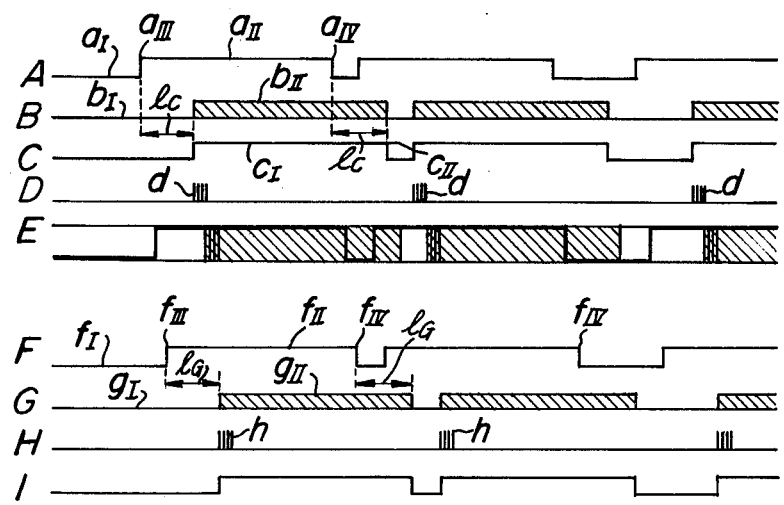
FIG. 2 is a timing chart of electric signals for illustration of the operation of the apparatus of FIG. 1.

Referring to FIGS. 4 and 5, sheet control signal PRC corresponds to signal F in FIG. 2, and sheet feed signal CLCH for driving the sheet feed clutch is obtained by buffer-amplifying the sheet control signal PRC by a buffer amplifier $BF_1$. Since actual engagement and/or disengagement of the sheet feed clutch (CLUTCH in FIG. 5) are delayed relative to the generation of sheet feed signal CLCH, then a transmission torque from the sheet feed clutch is produced at an interval of time after the occurrence of level changes 511 and 512 in sheet feed signal CLCH (or sheet control signal PRC), in the manner shown by delays 513 and 514, respectively. This delay time, in general, is as long as several tens ms. Therefore, if it is assumed that a duration of one scanning cycle is 5 ms., then the delay time is equal to several scanning cycles.

Cutter signal CUTR is produced as follows. At the trailing edge of sheet control signal PRC, a pulse is generated by a one-shot multivibrator. This pulse is applied to a buffer amplifier $BF_2$ so as to provide as cutter signal CUTR a pulse output of a magnitude large enough to energize the cutter. Supposing a cutting pulse signal 515 thus prepared has a width of, for example, 50 ms., then the pulse covers about ten scanning lines. Operation of the cutter (CUTTER in FIG. 5) by cutting pulse signal 515 is initiated with a delay after the generation of the cutting pulse signal 515, as represented by reference numeral 516 in FIG. 5.

The operation of the sheet feed clutch or the cutter initiates with a greater delay after the generation of sheet feed signal CLCH or cutter signal CUTR for energizing the sheet feed clutch and cutter, and the delay time largely amounts from several scanning lines to more than several tens of scanning lines. With a prior art device, the recording of image signal on a record sheet or transportation of a record sheet has been effected even such a duration, thus resulting in various problems as described in the above. In accordance with the present invention, in contrast thereto, the recording of an image on a record sheet or transportation of a record sheet is interrupted within the period of such a delay time, thus eliminating the above problems.

At the leading edge 511 of sheet control signal PRC, and at the trailing edge 512 of this signal, pulses are generated by one shot multivibrators $OS_2$ and $OS_3$, respectively, and these pulses are applied to a NOR gate NR to provide a NOR output $\overline{HLT}$ as a halt signal. The halt output $\overline{HLT}$ has halt durations 517 and 519, each of which has a width of, for example, about 100 ms. Thus, reception of sheet transportation request and skipping request is interrupted.

Transportation request signal LFD from decode processing portion 33 shown in FIG. 3 senses response signal EOL, and is raised to an H-level only when response signal EOL is raised to an H-level, thereby giving the transportation request. This is schematically shown by reference numerals 550 and 561 in FIG. 5. A confirmation of receiving request by response signal EOL is provided in response to the transportation request 561 and in synchronism with the rotary scanning operation which is a main scanning operation.

Synchronizing pulse signal SYNC is generated at the initial stage of the scanning operation to trigger a one shot multivibrator $OS_4$, thereby producing a scanning line signal LN. Scanning line signal LN is so adjusted as to be raised to an H-level during a period in which the effective scanning for recording is effected. The trailing edge of scanning line signal LN triggers a one shot multivibrator $OS_5$, thereby providing an end pulse signal $\overline{TL}$. Scanning line signal LN is raised as shown by a reference numeral 531 in response to synchronizing pulse 521, and after the lapse of a duration of the effective scanning for record, and at the terminating stage of this duration, an end pulse 542 is formed in end pulse signal $\overline{TL}$.

Transportation request signal LFD is fed to one input terminal of a NAND gate NA. To the other input terminal of NAND gate NA is fed halt signal $\overline{HLT}$ from NOR gate NR. The output from NAND gate NA is fed to one terminal D of a D-flip-flop FF. By this time, scanning line signal LN has been fed to the other terminal CK of D-flip-flop FF. Thus, the trailing edge of response signal EOL which is an output of D-flip-flop FF occurs at the leading edge 531 of scanning line signal LN following the transportation request 561, stated otherwise, the trailing edge of this signal EOL occurs in synchronism with synchronizing pulse 521. The trailing edge of response signal EOL represents receipt of transportation request, and decode processing portion 33 in FIG. 3 responds to a response 551 of response signal EOL, and immediately generates image signal PEL. Image signal PEL produces a record signal REC through buffer amplifier $BF_3$ in FIG. 4. Record signal REC in turn is recorded in the receiving and recording mechanism portion 35 in FIG. 3. Upon generation of end pulse 542, the record of image signal for one scanning line is terminated, and response signal EOL is set to an H-level designated by reference numeral 552. Decoding portion 33 in FIG. 3, when received response 552 of response signal EOL, resets transportation request signal LFD in the form as represented by reference numeral 562. Sub-scanning motor driving pulse signal SMD triggers a one shot multivibrator $OS_6$ when the transportation request is received, namely, at the trailing edge of response signal EOL. The one shot multivibrator $OS_6$ provides an output pulse 591. Output pulse 591 from one shot multivibrator $OS_6$ passes through OR gate OR to drive a sub-scanning pulse motor, whereby a record sheet is transported.

Referring to halt signal $\overline{HLT}$, transportation request 563 is blocked in NAND gate NA, in the presence of halt request 517 at the time that halt request 517 is given. Consequently, the output of NAND gate NA is maintained at an H-level for a duration of halt request 517. Thus, the H-level output is always applied to D-flip-flop FF, using scanning line signal LN as a clock input, so that response signal EOL is maintained at a level represented by reference numeral 552. For a duration of halt request 517, a sign of reception does not appear in response signal EOL, irrespective of transportation request 563, and hence neither recording of an image signal on a record sheet or transportation of a record sheet is performed. During the halt request, image signals are stored in buffer memory 32 shown in FIG. 3, having no likelihood of being lost.

When the sheet feed clutch is turned to the engaging position and halt signal $\overline{HLT}$ is released to return to a level 518, then response signal EOL, in response to synchronizing pulse 523 following the release of halt signal, sends a sign of receipt of transportation request 563, which sign is represented by reference numeral 553. Thereafter, the record of an image onto a record sheet and transportation of a record sheet are processed as mentioned in the above.

It is obvious from the above that the operation responsive to transportation request signal LFD is achieved by repetition of the above operation and operation for halt request 519 in response to the trailing edge 512 of sheet control signal PRC is quite the same as that for halt request 517.

It is noted that the operation responsive to skip request signal SKP is substantially similar to the operation responsive to transportation request signal LFD. A notable difference therebetween is in that the responsive operation in the former is effected in synchronism with the synchronous pulse signal, whereas the operation in the latter is asynchronous therewith. At the time of skipping operation, no recording of an image is effected, as set forth in the foregoing.

A duration of skip request of skip request signal SKP supplied from decode processing portion 33 in FIG. 3 by no means overlaps a duration of transportation request. The skip request signal senses response signal EOS, and the skip request is provided by raising the skip request signal to an H-level only when response signal EOS is maintained at an H-level. For example, if a skip request 585 is provided in skip request signal SKP in accordance with response level 573 of response signal EOS, no halt request is provided by halt signal $\overline{HLT}$ at this instant. If halt signal $\overline{HLT}$ is at an H-level, then AND gate AN remains open to trigger a one shot multivibrator $OS_7$ at the leading edge of skip request 585. Response signal EOS is a Q output of one shot multivibrator $OS_7$ and hence asynchronous with synchronizing pulse signal SYNC. When response signal EOS transmits a sign of reception represented by reference numeral 574, the Q output of one shot mutivibrator $OS_7$ concurrently rises to trigger a one shot multivibrator $OS_8$, whereby a sub-scanning motor driving pulse 595 is generated. Consequently, transportation of a record sheet is performed independent of the rotary scanning operation. The duration of response 574 in response signal EOS is determined to be long enough to accomplish transportation of a record sheet corresponding to one scanning line, for example, in the order of 4 ms. When response signal EOS is returned to a response 575, the decode processing portion 33 in FIG. 3 resets skip request signal SKP as shown by reference numeral 586, and subsequently skip request 578 is set. The similar operation will be repeated, unless any halt request appears in halt signal $\overline{HLT}$.

If halt request 519 appears in halt signal $\overline{HLT}$, skip request 588 is blocked by AND gate AN, and one shot multivibrator $OS_7$ is not triggered until halt request 519 is released. Therefore, neither recording of image signal or transportation of a record sheet is performed.

When the halt request is released after completion of the operation of the sheet feed clutch and cutter, the output of AND gate AN is raised to an H-level, so that one shot multivibrator $OS_7$ is triggered to provide a response 578. Thereafter, a sub-scanning motor driving pulse 598 is generated in like manner as described above, thereby permitting transportation of a record sheet.

It should be considered that the above-described mode of skip is only an example of a mode of recording an image signal on a record sheet and transporting the record sheet.

The arrangement according to the present invention can perfectly maintain in an ideal state timings of recording an image on a record sheet, transportation of the record sheet, feeding of a roll sheet or cutting of the roll sheet to a desired length, at the time of engagement and/or disengagement of the sheet feed clutch or at the time of operation of the cutter, as well as provides ease of adjustment of various mechanisms incorporated in the apparatus. This results in an improved recorded image and a stabilized length of a sheet cut from a roll sheet, with the freedom of the jamming of record sheets to the peripheral mechanisms.

What is claimed is:

1. An improved control apparatus for use in a frequency band compression facsimile receiver adapted to generate a record signal and means for controlling and cutting of a web of material into a record sheet of a given length and means for advancement of said record sheet as cut; said receiver including: web roller means for advancing said web and cooperating with feed clutch means; said clutch means acting upon said roller means to control advancement of said web; means for cutting a sheet from said web record sheet feed signal means and record sheet roller means for advancing said cut record sheet in response to drive means; said improvement comprising: means for generating a halt signal for a given duration during actuation of said feed clutch, said halt signal acting to de-energizing advance of said web at the time of operation of a web sheet cutter; means for storing the record signal and record sheet feed signal received during generation of said halt signal; means associated with said receiver for interrupting reception of a record signal to said receiver and other signal means for transporting said record sheet.

2. An improved control apparatus as claimed in claim 1, wherein: said halt signal generating means are provided for generating a said halt signal, defined by: first and secnd one shot multivibrators for receiving sheet control signal and a NOR gate for receiving both outputs from said first and second one shot multivibrators, for producing an NOR output to define said halt signal; said interrupting reception means being formed by an NAND gate for receiving said signal means for transporting said record sheet and said halt signal for producing a transportation signal when said halt signal is not received and an AND gate receiving said halt signal and a skip request signal for skipping the record sheet without recording to produce a response signal for permitting reception of said skip request.

3. An improved control apparatus for use in frequency band compression facsimile receiver adapted to generate a record signal and means for controlling and cutting of a web of material into a record sheet of a given length and means for advancement of said record sheet as cut; said receiver including: web roller means for advancing said web and cooperating with feed clutch means; said clutch means acting upon said roller means to control advancement of said web; means for cutting a sheet from said web record sheet roller means for advancing said cut record sheet in response to drive means; said improvement comprising: means for generating a halt signal for interrupting reception of a record sheet feed signal and a record signal and temporarily stopping the feeding operation of the record sheet and temporarily stopping recording operation on the record sheet; means for re-actuating feed of the record sheet and recording on the record sheet; and buffer memory means for storing the record sheet feed signal and record signal respectively, received during generation of the halt signal and transmitting said respective signals after the cutting operation has been completed to permit functioning of said apparatus to a pre-halt signal condition.

* * * * *